G. W. Ensminger,
Wire Fence,
Nº 84,810. Patented Dec. 8, 1868.
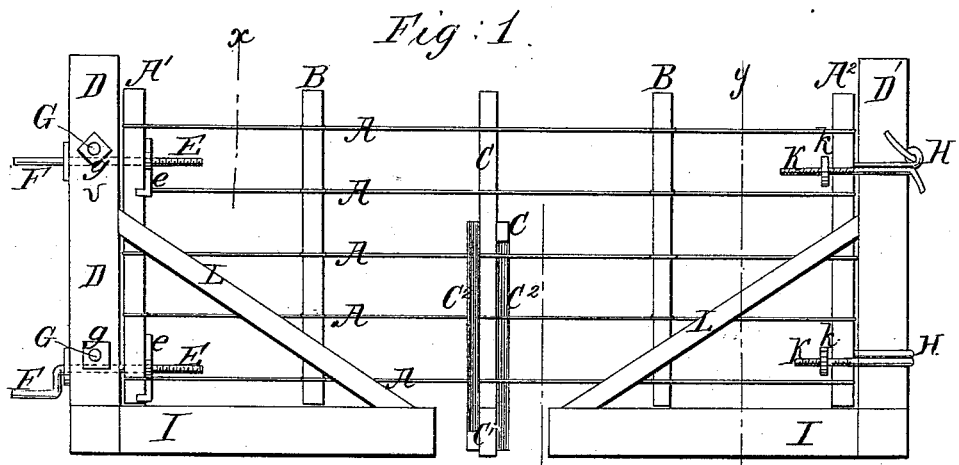
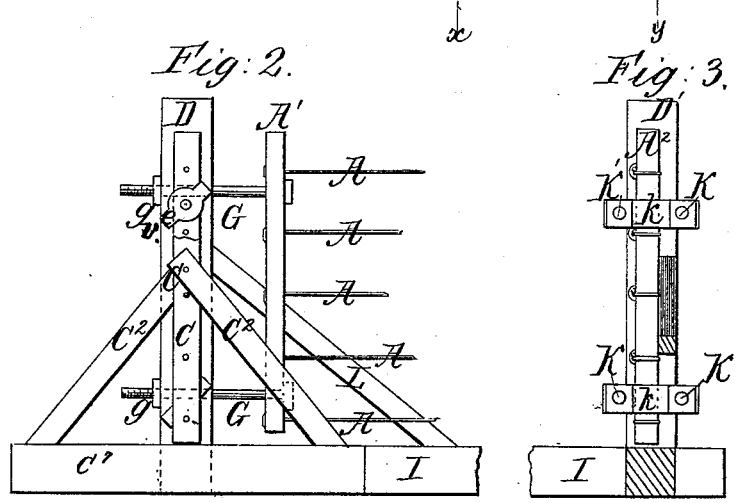
Witnesses
C. A. Pettit
G. C. Kennon
Inventor;
G. W. Ensminger
by _____ & Co
Atty

GEORGE WILLIAM ENSMINGER, OF RICHLAND, IOWA.

Letters Patent No. 84,810, dated December 8, 1868.

IMPROVEMENT IN WIRE FENCE.

The Schedule referred to in these Letters Patent and making part of the same.

*To all whom it may concern:*

Be it known that I, GEORGE WILLIAM ENSMINGER, of Richland, Tama county, State of Iowa, have invented a new and improved Portable Wire Fence; and I do hereby declare that the following is a full and exact description thereof, reference being had to the accompanying drawings, and to the letters of reference marked thereon.

Figure 1 is a side view of my invention.

Figure 2 is a transverse vertical section through the line $x\ x$, fig. 1.

Figure 3 is a transverse vertical section through the line $y\ y$, fig. 1.

The nature of my invention consists in building a portable wire fence in complete sections, which combine extreme lightness with great strength and durability, which sections, when properly strained, are supported by portable posts.

To enable others skilled in the art to make and use my invention, I will proceed to describe its construction and operation.

I construct my fence in sections, of such length as may be desirable, usually about twenty rods each, a section consisting of any desired number of wires, two movable posts, two or more slats, and an intermediate support, as hereinafter described.

The ends of the wires A are firmly fastened to the movable post $A^1$ by being passed through holes in the post, and then wrapped around it. The wires are then passed around slats B, at intervals of about ten feet, introducing, at the end of every forty feet in length, a support, C, (consisting of a post or standard, $c$, mortised into a sill or bed-piece, $c^1$, and strengthened by diagonal braces, $c^2$,) wrapping the wires around the standard $c$ in the same manner as around the slats, and further securing the wires by staples driven into the standard. The slats B and supports C are thus introduced until a section of twenty rods is completed, terminating with a movable post, $A^2$, to which the ends of the wires are attached in the same manner as to the movable post $A^1$.

The corner-posts D $D^1$ $D^2$ $D^3$ are mortised into sills I, and strengthened by diagonal braces L, and are held in position by stakes driven into the ground.

In setting up the fence, the movable post $A^2$ is fastened to the corner-post $D^1$ by bending around the corner-post two or more iron rods, K, the ends of which are provided with screw-threads, and are passed through holes in plates $k$, and secured by nuts, in such a manner as to hold the movable post $A^2$ between the corner-post $D^1$ and the plates $k$, as shown in figs. 1 and 3; or, the movable post and corner-post may be united by stout wires, H, passed around them, and twisted, as shown in fig. 1.

When one end of the section is thus united to the corner-post $D^1$, the other end is drawn close to the corner-post D, and the section strained to the proper degree of tightness by means of screws E and nuts $e$, the screws E passing through the corner-post D and movable post $A^1$, and having the outer ends formed into cranks, F, by which they are turned, and the nuts $e$ being provided with lugs, which prevent them from turning; or, the section may be strained and secured by means of screws G and nuts $g$, as shown in fig. 2.

When it is desired to connect two sections together in a straight line, without the intervention of a stationary post between them, it may be accomplished by means of two or more rods, each rod having on one end a right-hand-screw thread, and on the other end a left-hand-screw thread, which rods may be passed through holes in the movable posts $A^1\ A^2$, and secured by nuts, the portion of the rod between the screw-threads being left square, so as to be turned by a wrench.

After the fence, or a section thereof, has been set up, as above described, if it is desired to remove the screws, nuts, and plates, for the purpose of using them in setting up other sections, a stout wire, H, may be passed around the movable posts and corner-posts, and twisted, as shown in fig. 1, by which means the ends of the sections are held securely to the corner-posts, and the screws, nuts, and plates may be removed without lessening the security of the fence.

Having thus described my invention,

What I claim as new, and desire to secure by Letters Patent, is—

1. A portable wire fence, formed in sections, composed of the wires A, movable posts $A^1\ A^2$, slats B, supports C, and corner-posts D $D^1$, constructed as herein described.

2. The rods K and plates $k$, and the screws E and nuts $e$, in combination with the movable posts $A^1\ A^2$, and corner-posts D $D^1$, arranged and operating in the manner herein described, and for the purpose specified.

3. The wires H, and the screws G, and nuts $g$, in combination with the movable posts $A^1\ A^2$, and corner-posts D $D^1$, arranged and operating in the manner and for the purpose herein described.

GEORGE WM. ENSMINGER.

Witnesses:
JOHN HANNA,
F. J. M. WONSER.